United States Patent [19]

Mueller et al.

[11] Patent Number: 5,348,938

[45] Date of Patent: * Sep. 20, 1994

[54] OLEOPHILIC ALCOHOLS AS A CONSTITUENT OF INVERT DRILLING FLUIDS

[75] Inventors: Heinz Mueller, Monheim; Claus-Peter Herold, Mettmann; Stephan von Tapavicza, Erkrath, all of Fed. Rep. of Germany

[73] Assignee: Henkel Kommanditgesellschaft auf Aktien, Fed. Rep. of Germany

[*] Notice: The portion of the term of this patent subsequent to Mar. 16, 2010 has been disclaimed.

[21] Appl. No.: 54,462

[22] PCT Filed: Mar. 29, 1990

[86] PCT No.: PCT/EP90/00499

§ 371 Date: Oct. 7, 1991

§ 102(e) Date: Oct. 7, 1991

[87] PCT Pub. No.: WO90/12070

PCT Pub. Date: Oct. 18, 1990

Related U.S. Application Data

[63] Continuation of Ser. No. 768,937, Oct. 7, 1991, abandoned.

[30] Foreign Application Priority Data

Apr. 7, 1989 [DE] Fed. Rep. of Germany ....... 3911238

[51] Int. Cl.$^5$ .................................................. C09K 7/02
[52] U.S. Cl. ..................................... 507/139; 507/136; 507/138
[58] Field of Search .................... 507/136, 138, 139

[56] References Cited

U.S. PATENT DOCUMENTS

| | | | |
|---|---|---|---|
| 1,999,147 | 4/1935 | Ambrose et al. | 252/8.5 |
| 2,661,334 | 12/1953 | Lummus | 252/8.5 |
| 3,062,740 | 11/1962 | Reddie et al. | 252/8.5 |
| 3,244,638 | 4/1966 | Foley et al. | 252/8.5 |
| 3,338,830 | 8/1967 | Stokes et al. | 252/8.9 |
| 3,761,410 | 9/1973 | Mondshine et al. | 252/8.5 |
| 4,409,108 | 10/1983 | Carney et al. | 507/138 |
| 4,631,136 | 12/1986 | Jones, III | 507/138 |
| 4,839,096 | 6/1989 | Dennis et al. | 507/136 |

OTHER PUBLICATIONS

Gray et al, *Composition and Properties of Oil Well Drilling Muds* (Houston, Gulf Publishing Co., 1980) pp. 319–324.

Peters, R., "Alcohols, Higher Aliphatic" in: *Kirk–Othmer Encyclopedia of Chemical Technology* (1991 ed.), vol. 1, pp. 885–887.

*Primary Examiner*—Gary Geist
*Attorney, Agent, or Firm*—Ernest G. Szoke; Wayne C. Jaeschke; Real J. Grandmaison

[57] ABSTRACT

The use is described of
a) mono- and/or polyfunctional alcohols of natural and/or synthetic origin which are at least largely water-insoluble and are fluid and pumpable in the temperature range of 0° to 5° C., or of b) solutions, fluid and pumpable in the given temperature range, in ecologically-acceptable water-insoluble oils, of at least largely water-insoluble mono- and/or polyfunctional alcohols of natural and/or synthetic origin, as the continuous oil phase of drilling fluids, which exist as W/O-emulsions, have a dispersed aqueous phase and preferably have further usual additives in the alcohol-containing oil phase, and which are suitable for the environment-friendly development of, e.g., petroleum and natural gas deposits. Drilling fluids of the above type are also described, which are characterized in that they contain as the continuous oil phase, or dissolved in ecologically-acceptable water-insoluble oils, an additive of at least largely water-insoluble mono- and/or polyfunctional alcohols, the oil phase in each case being fluid and pumpable in the temperature range of 0° to 5° C. and having flash points above 80° C.

13 Claims, No Drawings

OLEOPHILIC ALCOHOLS AS A CONSTITUENT OF INVERT DRILLING FLUIDS

This application is a continuation, of application Ser. No. 07/768,937 filed on Oct. 7, 1991 now abandoned.

BACKGROUND OF THE INVENTION

1. Field of the Invention

The invention discloses new drilling fluids and invert drilling muds based thereon, which are distinguished by high ecological acceptability and at the same time good storage and application properties. An important area of application for the new drilling fluid systems is in offshore wells for the development of petroleum and/or natural gas deposits, the aim of the invention being particularly to make available industrially usable drilling fluids with high ecological acceptability. The use of the new drilling fluid systems has particular significance in the marine environment, but is not limited thereto. The new mud systems can be put to quite general use even in land-based drilling, for example, in geothermal wells, water bore-holes, in the drilling of geoscientific bores and in drilling for the mining industry. Here too it is essentially true that associated ecotoxic problems are substantially simplified by the ester-based drilling-oil fluids selected according to the invention.

2. Discussion of Related Art

Oil-base drilling fluids are generally used in the form of so-called invert-emulsion muds, which consist of a three-phase system: oil, water and finely particulate solids. These are preparations of the W/O-emulsion type, i.e. the aqueous phase is distributed as a heterogeneous fine dispersion in the continuous oil phase. A number of additives can be used to stabilize the system as a whole and to confer on it the desired application properties, particularly emulsifiers or emulsifier systems, weighting agents, fluid-loss additives, alkali reserves, viscosity regulators and the like. For details, refer, e.g., to the publication by P. A. Boyd et al., "New Base Oil Used in Low-Toxicity Oil Muds" Journal of Petroleum Technology, 1985, 137 to 142, and R. B. Bennett, "New Drilling Fluid Technology—Mineral Oil Mud" Journal of Petroleum Technology, 1984, 975 to 981 and the literature cited therein.

The importance of ester-based oil phases in reducing the problems created by such oil-base muds has been recognized for some time in the relevant field of technology. For example, U.S. Patent Specifications 4,374,737 and 4,481,121 disclose oil-base drilling fluids in which non-polluting oils are to be used. The following are mentioned as of equal value as the non-polluting oils-mineral oil fractions which are free from aromatic hydrocarbons, and vegetable oils, such as peanut oil, soybean oil, linseed oil, corn oil, rice oil or even oils of animal origin, such as whale oil. These named ester oils of vegetable and animal origin are all, without exception, triglycerides of natural fatty acids, which are known to be of high environmental acceptability, and are clearly superior ecologically to hydrocarbon fractions—even when these do not contain aromatic hydrocarbons.

Interestingly enough, however, not one of the examples in the above U.S. Patent Specifications describes the use of such natural ester oils in invert-drilling fluids of this type. In every case, mineral oil fractions are used as the continuous oil phase. Oils of vegetable and/or animal origin are not considered for practical reasons. The rheological properties of such oil phases cannot be controlled over the wide temperature range generally required in practice, from 0° to 5° C. on the one hand, up to 250° C. on the other.

THE APPLICANT's EARLIER PROPOSALS

Ester oils of the type in question do not in fact behave in the same way in practice as the previously used mineral oil fractions based on pure hydrocarbons. Ester oils are subject to partial hydrolysis in practical use, particularly in W/O-invert drilling muds. Free carboxylic acids are formed as a result. The Applicant's earlier Applications P 38 42 659.5 and P 38 42 703.6 U.S. Ser. Nos. 07/452,457 and 07/452,988 describe the problems caused thereby and give proposals for their solution. Further types of usable ester oils are disclosed in the earlier Patent Applications P 39 07 391.2 and P 39 07 392.0 (U.S. application Ser. No. 07/752,694, filed Sep. 6, 1991, now abandoned and U.S. application Ser. No. 07/752,692, filed Sep. 6, 1991, now abandoned).

The subject of these earlier Applications is the use of ester oils based on selected monocarboxylic acids or monocarboxylic acid mixtures and monofunctional, and optionally polyfunctional, alcohols. The earlier Applications show that, with the esters and ester mixtures they disclose, it is not only possible to invest fresh drilling fluid with satisfactory rheological properties, but it is also possible to use selected known alkali reserves in the drilling fluid and in this way to retard undesirable corrosion. As alkali reserves—particularly when ester oils based on carboxylic acids with at least 6 carbon atoms are used-calcium hydroxide, or lime, can be added and/or can be used with zinc oxide or comparable zinc compounds. In this case, however, an additional restriction is advisable. To prevent unwanted thickening of the oil-base invert mud system in practical use, the amount of alkalizing additive, and in particular the amount of lime, must be limited. The maximum amount permitted in the disclosure of the aforementioned earlier Applications is about 2 lb/bbl (pounds/-barrel) of oil-base mud.

An important further development of these invert-drilling fluids based on ester oils is the subject of the Applicant's earlier Application P 39 03 785.1 U.S. Ser. No. 07/478,185.

The teaching of this earlier Application is based on the concept of using a further additive in the invert drilling fluids based on ester oils, which is suited to keeping the desired rheological properties of the drilling fluid within the required range, even when ever larger amounts of free carboxylic acids are formed in use by partial ester hydrolysis. These liberated carboxylic acids should not only be caught in a harmless form, it should moreover be possible to convert these free carboxylic acids, preferably into valuable components with stabilizing or emulsifying properties for the whole system. According to this teaching, basic amine compounds of marked oleophilic nature and at most limited water solubility, which are capable of forming salts with carboxylic acids, can be used as additives in the oil phase. The oleophilic amine compounds can at the same time be used at least in part as alkali reserves in the invert drilling fluid, they can, however, also be used in combination with conventional alkali reserves, particularly together with lime. The use of oleophilic amine compounds which are at least largely free from aromatic constituents is preferred. In particular, optionally olefin-unsaturated aliphatic, cycloaliphatic and/or heterocyclic oleophilic basic amine compounds, can be considered, which contain one or more N-groups capable of forming salts with carboxylic acids. In a preferred embodiment the water-solubility at room temperature of these amine compounds is at most about 5% by weight and is most preferably below 1% by weight.

Typical examples of such amine compounds are primary, secondary and/or tertiary amines, which are at least largely water-insoluble, and which can also to a limited extent be alkoxylated and/or substituted, particularly with hydroxyl groups. Further examples are the corresponding aminoamides and/or heterocyclic compounds with nitrogen as a ring constituent. For example, basic amine compounds are suitable which have at least one long-chain hydrocarbon radical, preferably of from 8 to 36 carbon atoms, particularly with 10 to 24 carbon atoms, which can also be olefin mono- or polyunsaturated. The oleophilic basic amine compounds can be added to the drilling fluid in amounts of up to about 10 lb/bbl, preferably in amounts up to about 5 lb/bbl and particularly in the range of about 0.1 to 2 lb/bbl.

It has been found that the addition of such oleophilic basic amine compounds can effectively prevent thickening of the mud system, which presumably can be attributed to a disturbance of the W/O invert system and also to the formation of free carboxylic acids by ester hydrolysis.

THE INVENTION PROBLEM AND ITS TECHNICAL SOLUTION

The problem of the present invention is further to develop systems of the type in question and in particular drilling fluids of high ecological acceptability. In a first embodiment the invention proposes to make available oils and oil mixtures for the production of drilling fluids based on W/O-emulsions, which can be used industrially and are easily accessible and at the same time are distinguished by high ecological acceptability. In a further embodiment the invention intends to make available additives for the aforementioned systems in question here which confer valuable additive properties on drilling fluids based on W/O-emulsions without having a disadvantageous effect on their ecological acceptability.

DESCRIPTION OF THE INVENTION

Other than in the operating examples, or where otherwise indicated, all numbers expressing quantities of ingredients or reaction conditions used herein are to be understood as modified in all instances by the term "about".

The technical solution of the problems of the invention starts from the knowledge that selected alcohols suited to this use can result in new and improved drilling fluids of the type described. These alcohols are water-insoluble or essentially water-insoluble components, in particular therefore corresponding compounds with a pronounced oleophilic nature, which differ, however, from pure hydrocarbon compounds by the presence of the functional hydroxyl groups. As a result important technological improvements can be made and at the same time high ecological acceptability is ensured. Non-toxic hydrocarbon compounds with alcohol functions are known to be easily processed in the cycle of the living world.

The subject of the invention, accordingly, in a first embodiment, is the use of a) mono- and/or poly-functional alcohols of natural and/or synthetic origin which are at least largely water-insoluble and are fluid and pumpable in the temperature range of 0° to 5° C.

or of b) solutions, fluid and pumpable in the given temperature range, in ecologically-acceptable water-insoluble oils, of at least largely water-insoluble mono- and/or poly-functional alcohols of natural and/or synthetic origin as the continuous oil phase of drilling fluids, which exist as W/O emulsion, which have in the alcohol-containing oil phase a dispersed aqueous phase and preferably further usual additives, and which are suitable for the environmentally acceptable development of, for example, petroleum or natural gas deposits.

In a further embodiment, the invention relates to invert drilling fluids, as described above, which are characterized in that they contain, as the continuous oil phase or dissolved in ecologically acceptable oils, and additive which consists at least predominantly of water-insoluble mono- and/or polyfunctional alcohols, such that the oil phase in each case is fluid and pumpable in the temperature range of 0° to 5° C. and has flash points above 80° C.

THE VARIOUS EMBODIMENTS OF THE INVENTION

In a first embodiment the continuous oil phase of the invert drilling fluids is formed exclusively, or to by far the largest part, by the essentially water-insoluble and preferably markedly oleophilic alcohols. Understandably, the rheology of the alcohols used here must be suited to the technical requirements of the drilling fluids. Slight rheological adjustments are possible by adding small amounts of the diluents provided in this embodiment. In the case described here, in particular oil phases are considered, which are formed by more than 70% by weight, preferably by more than 80% by weight, and desirably exclusively, by the alcohols themselves. The general subject knowledge is applicable for the rheological requirements of such oils for use in drilling fluids, and this will be discussed again below. From the wide range of markedly oleophilic alcohols with in particular a straight-chain and/or branched-chain hydrocarbon structure, primary consideration is given here to the monofunctional alcohols with at least 6 or 7 carbon atoms, preferably with at least 8 carbon atoms, in which the possible upper limit for the number of carbon atoms is greatly influenced by the structure of the hydrocarbon radical. The rheology of branched-chain and/or unsaturated alcohols of the type in question here is known to satisfy the requirements of flowability and pumpability, even at lower temperatures, more easily than a straight-chain saturated hydrocarbon structure. Saturated straight-chain fatty-alcohols with from 16-18 carbon atoms are known to have high solidification ranges around 50° C., while the olefin unsaturated oleylalcohol solidifies below 4° C. Branched alcohols of the same carbon-number range can—depending on the extent and degree of branching—constitute completely acceptable fluid and pumpable oil phases in the sense of the invention. In the field of saturated monofunctional alcohols, the range with low numbers of carbon atoms is particularly suitable, particularly therefore those with from about 8 to 14 carbon atoms, and here too the branched-chain alcohols can have rheological advantages.

The oil-mixture components optionally used in small amounts in this embodiment can be pure hydrocarbon compounds especially those free from aromatic hydrocarbons, in particular selected ester oils of the type described in the Applicant's earlier Applications mentioned above.

The rheological properties of the alcohol components used according to the invention become less and less important, the greater the proportion of these mixture constituents in the admixture with one or more oil components. A second embodiment of the invention relates accordingly to the use of oil phases in systems of the type in question which still have considerable or even predominant amounts of non-water-miscible oils which are used in admixture with the markedly oleophilic alcohols provided according to the invention. The content of the alcohols selected according to the invention in this embodiment is as a rule more than 10% by weight and up to about 70% by weight—each referred to the fluid oil phase—alcohol fractions in amounts of at least about 35% by weight and preferably of at least about 50% by weight of the oil phase may be preferred. The rheology of such systems is already determined to a very great extent by the nature of the compounds used as mixture components. It will, however, also be shown that the use of alcohols as provided for in the invention can also have considerable practical significance for these embodiments.

As the mixture components for this second embodiment of the invention, there can again be considered both pure hydrocarbon oils, particularly those free from aromatic hydrocarbons, and especially ester oils of the type described in earlier Applications by the Applicant. Admixtures of these types also fall within the framework of the invention, with both admixtures of ester oils with pure hydrocarbon compounds and mixtures of various ester oil types possible for use as mixture components for general application with the oleophilic alcohols. In preferred embodiments of the invention, the pure hydrocarbon oils with no functional groups at all are used in the oil phase in amounts of at most 50% by weight, preferably of at most about 35% by weight and particularly in amounts of at most about 25% by weight—each referred to the oil phase. In the most important embodiments of the variants described here, mixtures of the alcohols and ester oils defined according to the invention are used as the oil phase without the addition of pure hydrocarbon compounds.

The invention finally relates in a third variant to the use of practically water-insoluble alcohols with a particularly marked oleophilic character as additives in the oil phase of the aforementioned drilling fluids based on W/O-emulsions. The amount of alcohols used according to the invention is generally in the range of about 0.1 to a maximum of 10% by weight, preferably in the range of about 1 to 5% by weight of the oil phase. The range of suitable water-insoluble alcohols can understandably be enlarged substantially in this embodiment. The rheology of the system as a whole is no longer determined here by the rheological values of the alcohol. It is in this embodiment that the use of the alcohols defined according to the invention as additives achieves important improvements in the behavior of drilling fluids of the aforementioned type.

This is true in particular for invert systems in which the main component of the continuous oil phase is formed exclusively or primarily by ester oils of the type described in the above earlier Applications of the Applicant. In the embodiment in question here, the oil phase is constituted accordingly by at least 25% by weight, preferably by at least 50% by weight and particularly by at least about 75 to 80% by weight of the oil phase, by aster oil as the main component. Pure hydrocarbon oils of the prior art can be used for the rest of the oil phase, it is however advantageous to dispense with them altogether.

By adding to the invert systems the water-insoluble alcohols defined according to the invention, important improvements can be achieved in the practical use of the drilling fluids. The following 4 aspects are particularly affected: reduction of the fluid-loss values, the facilitation and improvement of the emulsification of the dispersed aqueous phase, in some cases clearly improved lubrication by the drilling fluid and in some cases a distinct improvement in the rheological properties of invert drilling fluids based on ester oils.

The Alcohol Components Used According to the Invention

The use of the alcohols as the oil phase, but also their combination as a lesser or greater part in the oil phase, requires these alcohol components to have adequate water-insolubility. The water-solubility of suitable alcohols at room temperature preferably lies below 5% by weight, particularly under 1% by weight and preferably not more than about 0.5% by weight.

The following general rules apply for the chemical nature of the alcohols: Monofunctional and/or polyfunctional alcohols are suitable, provided that the oleophilic character of the alcoholic components is safeguarded. In particular, difunctional compounds and/or partial ethers of polyfunctional alcohols with at least one free hydroxyl group can be considered in addition to the monofunctional alcohols. The alcohols themselves should be ecologically acceptable and accordingly in the preferred embodiment should have no aromatic constituents. Straight-chain and/or branched aliphatic or also corresponding unsaturated, particularly olefin mono- and/or poly-unsaturated, alcohols are the preferred compounds. Cycloaliphatic alcohols can also be considered.

An important general requirement in the sense of the invention is that these alcohols as such are not only ecologically acceptable, but also do not initiate any other toxicological risks, particularly by inhalation. Alcohols with a marked oleophilic nature, as required according to the invention, are in any case usually distinguished by such a low volatility that this requirement is satisfied without any problem.

The following should also be noted for the admixture of the alcohols used in the invention with ester oils: The free alcohols used according to the invention can be the same as or different from the alcohol components employed in the ester oil. While the alcohol component in the ester oils is determined, for example, by considerations of the rheology of the ester oil and/or of the availability of the ester-forming alcohols, the use of the free alcohols as in the invention is proposed in order to achieve the desired improvements in the invert drilling fluid.

If the alcohols are used as at least a substantial part, as the major part of even as the only compound in the oil phase, then the alcohols should be fluid and pumpable at lower temperature, particularly in the range of 0° to 5° C., it should be possible for them to be liquefied to the flowable phase with the limited amounts of ecologically acceptable mixture components. The solidification values of such oil phases (pour point and setting point) should be below 0° C., preferably below −5° C. and particularly below −10° C. The alcohols themselves should have flash points of at least 80° C., preferably of at least 100° C. a of at least 120° C. In addition to the already mentioned monofunctional alcohols with at least 8 carbon atoms and of an upper carbon number determined by their structure and rheological requirements, selected polyols or their partial ethers can also be considered. Suitable polyols are in particular optionally branched-chain diols with a sufficient content of the oleophilic hydrocarbon radical in the molecule. Suitable examples are oleophilic diols with hydroxyl groups in the alpha,omega-position and/or diols which have their hydroxyl groups on adjacent carbon atoms. Characteristic examples of compounds of this type are 2,2-dimethyl-1,3-propanediol (neopentylglycol) or the saponification products of epoxidized olefins. Partial ethers of such diols with monofunctional alcohols, however, are also particularly to be considered.

Particularly in the embodiments in which the rheology of the system as a whole is determined primarily by the water-insoluble mixture components, thus particularly by the ester oils, there is increasing freedom in the choice of suitable alcohol components. Among others, at least largely water-insoluble polyalkyleneglycolethers or corresponding mixed ethers of lower alkyleneglycols have proved to be usable additives here. For example, corresponding mixed ethers of ethylene oxide and propylene oxide are also usable additives in the sense of the invention if they reach molecular weights of, e.g. 5000, and show sufficient water-insolubility in the system as a whole. Compounds of the latter type are particularly important in the embodiment, the subject of which is the addition of the water-insoluble alcohols as additives in an amount of a maximum of about 10% by weight.

In an important embodiment of the invention, water-insoluble alcohols are used which are themselves free from basic amino groups and also preferably do not contain any other reactive groups, e.g. carboxyl groups.

THE MIXTURE COMPONENTS IN THE OIL PHASE

Suitable oil components for the admixture according to the invention are the mineral oils currently used in drilling fluids, and preferably aliphatic and/or cycloaliphatic hydrocarbon fractions essentially free from aromatic hydrocarbons, with the required rheological properties. Refer here to the prior-art publications cited above and the available commercial products.

Particularly important mixture components, however, are ester oils which are ecologically acceptable as used in the invention, as described in particular in the aforementioned earlier Applications P 38 42 659.5, P 38 42.703.6, P 39 07 391.2 and P 39 07 392.0. U.S. Ser. Nos. 07/452,457, 07/452,988 U.S. application Ser. No. 07/752,694, filed Sep. 6 1991, now abandoned and U.S. application Ser. No. 07/752,692, filed Sep. 6, 1991, now abandoned. To complete the invention disclosure, the essential characteristics of these esters, or ester mixtures, are now briefly summarized.

In a first embodiment, as the oil phase, esters (fluid and pumpable in the temperature range of 0° to 5° C.) are used of monofunctional alcohols with from 2 to 12, particularly with from 6 to 12, carbon atoms and aliphatic-saturated monocarboxylic acids with from 12 to 16 carbon atoms, or an admixture thereof with at most about the same amounts of other monocarboxylic acids. Ester oils are preferred here which are based, to at least about 60% by weight—referred to the respective carboxylic acid mixture—on esters of aliphatic $C_{12-14}$-monocarboxylic acids, the remaining percentage preferably being based on smaller amounts of shorter-chain aliphatic and/or longer-chain, in particular olefin mono- or poly-unsaturated, monocarboxylic acids. Esters are preferably used which in the temperature range of 0° to 5° C. have a Brookfield (RVT) viscosity of not above 50 mPa.s, preferably not above 40 mPa.s and particularly of at most about 30 mPa.s. The esters used in the drilling mud have solidification values (pour and setting point) below −10° C., preferably below −15° C. and at the same time have flash points above 100° C., preferably above 150° C. The carboxylic acids present in the ester or ester mixture are straight-chain and/or branched, and are of vegetable and/or synthetic origin. They can be derived from the corresponding triglycerides, such as coconut oil, palm kernel oil and/or babassu oil. The alcohol radicals of the esters used are derived in particular from straight-chain and/or branched saturated alcohols, preferably with from 6 to 10 carbon atoms. These alcohol components can also be of vegetable and/or animal origin and can thus be obtained by the reductive hydrogenation of the corresponding carboxylic acid esters.

A further class of particularly suitable ester oils is derived from olefin mono- and/or poly-unsaturated monocarboxylic acids with 16 to 24 carbon atoms or their admixtures with smaller amounts of other, particularly saturated, monocarboxylic acids and monofunctional alcohols with preferably from 6 to 12 carbon atoms. These ester oils are also fluid and pumpable in the temperature range of 0° to 5° C. In particular those esters are suitable which are derived, by more than 70% by weight, preferably by more than 80% by weight and in particular by more than 90% by weight, from olefin-unsaturated carboxylic acids with from 16 to 24 carbon atoms.

Here too, the solidification values (pour and setting point) lie below −10° C., preferably below −15° C., while the flash points lie above 100° C. and preferably above 160° C. In the temperature range of 0° to 5° C., the esters used in the drilling mud have a Brookfield (RVT) viscosity of not more than 55 mPa.s, preferably not more than 45 mPa.s.

Two subclasses can be defined for the ester oils of the type in question. In the first, the unsaturated $C_{16-24}$-monocarboxylic acid radicals present in the ester are derived by not more than 35% by weight from olefin di- and poly-unsaturated acids, with preferably at least about 60% by weight of the acid radicals being olefin monounsaturated. In the second embodiment, the $C_{16-24}$-monocarboxylic acids present in the ester mixture are derived, by more than 45% by weight, preferably by more than 55% by weight, from olefin di- and/or poly-unsaturated acids. It is desirable for the saturated carboxylic acids with from 16 to 18 carbon atoms, which are present in the ester mixture, to amount to not more than about 20% by weight and in particular not more than about 10% by weight. Preferably, saturated carboxylic acid esters, however, have lower numbers of carbon atoms in the acid radicals. The carboxylic acid radicals present can be of vegetable and/or animal origin. Examples of vegetable raw materials are, for example, palm oil, peanut oil, castor oil and in particular rapeseed oil. The carboxylic acids of animal origin are in particular the corresponding mixtures of fish oils, such as herring oil.

A further interesting class of ester oils which can be used as mixture components for the use according to the invention, are esters which are fluid at room temperature and have flash points above 80° C., from $C_{1-5}$-monocarboxylic acids and mono- and/or polyfunctional alcohols, which are preferably also fluid and pumpable in the temperature range of 0° to 5° C. Particularly suitable are the corresponding esters of these lower carboxylic acids with monofunctional alcohols with at least 8 carbon atoms and/or esters of these acids with di- to tetra-hydric alcohols with preferably 2 to 6 carbon atoms. Acetic acid in particular is suitable for practical reasons as the ester-forming acid component in this class. The specifications for the rheology and volatility and the solidification values of the preferred esters in this sub-class correspond to the values given above.

From this sub-class, the suitable mixture components are, in particular, esters from monofunctional alcohols of natural and/or synthetic origin, the chain length of which in the presence of predominantly aliphatic-unsaturated alcohols can be in the range of 8 to 15 carbon atoms, but in the case of olefin mono- and polyunsaturated alcohols, can also consist of higher numbers of carbon atoms, for example, up to about 24 carbon atoms. Details can be found in the Applicant's earlier Patent Application P 39 07 391.2 (U.S. application Ser. No. 07/752,694, filed Sep. 6, 1991, now abandoned).

Suitable mixture components are finally, however, the esters, as described in the co-pending Application P 39 07 392.0 (U.S. application Ser. No. 07/752,692, filed Sep. 6, 1991, now abandoned), from monocarboxylic acids of synthetic and/or natural origin with from 6 to 11 carbon atoms and mono- and/or polyfunctional alcohols, which are preferably also fluid and pumpable in the temperature range of 0° to 5° C. To complete the invention disclosure, reference is made here to this extent to the above co-pending Application, the contents of which are hereby also made subject of the present disclosure.

Multi-substance mixtures fall within the scope of the invention which, together with the alcohols defined according to the invention, can contain one or more of the mixture components listed here individually. Essentially any mixtures can be used provided that they fulfil the basic rheological requirements for invert drilling fluids of the type referred to here. Examples of such multi-component mixtures are materials based on various types of ester oils or also substance mixtures additionally containing mineral oil.

FURTHER MIXTURE COMPONENTS OF THE INVERT DRILLING FLUID

These may be any of the usual mixture components for conditioning and for the practical use of invert drilling muds, such as are used currently when mineral oils provide the continuous oil phase. In addition to the dispersed aqueous phase, in particular emulsifiers, weighting agents, fluid-loss additives, viscosifiers and alkali reserves can be considered.

In an important embodiment of the invention, oleophilic basic amine compounds are used as additives together with the ester oils, these amine compounds are described in detail in the aforementioned earlier Application P 39 03 785.1 U.S. Ser. No. 07/478,185 of the Applicant. For details reference should be made to the disclosure of this earlier Application, as described above.

If ester oils are used as mixture components in the scope of the invention—in particular ester oils based on carboxylic acids with at least 6 carbon atoms—it can be advantageous not to employ significant amounts of strongly hydrophilic inorganic or organic bases in the oil-base fluid. Lime can be used effectively as an alkali reserve, in which case it is advantageous to limit the maximum amount of lime to be used to about 2 lb/bbl, and it may be preferred to work with a drilling-mud lime content slightly below this figure, e.g. from about 1 to 1.8 lb/bbl (lime/drilling fluid). Other known alkali reserves can be used in addition to, or in place of, the lime. The less basic metal oxides, such as zinc oxide, should particularly be mentioned. Even when these "acid traps" are used, care should still be taken to ensure that the amounts used are not too large, so as to prevent undesired premature ageing of the drilling fluid, which is associated with an increase in viscosity and therefore a deterioration in the rheological properties. The special features discussed here of the use according to the invention prevent, or at least restrict, the formation of undesirable amounts of highly active O/W-emulsifiers so that good rheological properties are maintained in practice for a sufficient period of time even when there is thermal ageing.

The following also applies:

Invert-drilling muds of the type being considered usually contain, together with the continuous oil phase, a finely dispersed aqueous phase in amounts from about 5 to 45% by weight and preferably from about 5 to 25% by weight. A dispersed aqueous phase from about 10 to 25% by weight can be regarded as particularly useful.

The following rheological data apply for the rheology of the preferred invert drilling muds according to the invention: plastic viscosity (PV) from about 10 to 60 mPa.s, preferably from about 15 to 40 mPa.s; yield point (YP) in the range from about 5 to 40 lb/100 ft$^2$, preferably from about 10 to 25 lb/100 ft$^2$-each measured at 50° C. Further details on the measurement of these parameters, the measuring methods used and the rest of the conventional composition of the invert drilling fluids described here, are given in the prior art as cited above and, for example, described in full in the "Manual of Drilling Fluids Technology" of NL-Baroid Co., London, GB, particularly in the chapters "Mud Testing-Tools and Techniques" and "Oil Mud Technology", which is freely accessible to interested experts. In summary, to complete the invention disclosure the following can be said:

The emulsifiers that can be used in practice are systems suitable for the formation of the required W/O-emulsions. In particular, selected oleophilic fatty acid salts, e.g. those based on amidoamine compounds, can be considered. Examples of these are described in the already cited U.S. Pat. No. 4,374,737 and the literature cited therein. A particularly suitable type of emulsifier is the product sold by NL-Baroid Co. under the brand name "EZ-mul".

Such emulsifiers are sold commercially as highly concentrated active-substance preparations and can, for example, be used in amounts from about 2.5 to 5% by weight, particularly in amounts from about 3 to 4% by weight—based on the ester oil phase.

Hydrophobized lignite particularly is used in practice as the fluid-loss additive and thus in particular to form a dense coating of a largely liquid-impermeable film on the bore-hole walls. Suitable amounts are, for example, from about 15 to 20 lb/bbl or from about 5 to 7% by weight, based on the oil phase.

The viscosifier usually employed in drilling fluids of the type in question is a cation-modified finely particulate bentonite, which can be used particularly in amounts from about 8 to 10 lb/bbl or from about 2 to 4% by weight, based on the oil phase. Barite is the weighting material generally used in relevant applications to establish the necessary pressure compensation, the amounts added being varied according to the drilling conditions anticipated in each case. By adding barite, it is, for example, possible to raise the specific gravity of the drilling fluid to 2.5 and preferably to a value in the range from about 1.3 to 1.6.

The dispersed aqueous phase in these invert drilling fluids is loaded with soluble salts, calcium chloride and/or potassium chloride are mainly used here. Saturation, at room temperature, of the aqueous phase with the soluble salt is preferred.

The aforementioned emulsifiers, or emulsifier systems, optionally also serve to improve the oil wettability of the inorganic weighting materials. In addition to the aminoamides already mentioned, further examples are alkylbenzene sulfonates and imidazoline compounds. Additional information regarding the relevant Prior Art can be found in the following Patent Specifications: GB 2 158 437, EP 229 912 and DE 32 47 123.

EXAMPLES

EXAMPLES 1 TO 4

In the following Examples 1 to 4, invert fluids based on selected alcohols, or based on alcohol mixtures, in a ratio of oil/water of 80/20 are used in the following basic formulation:
200 ml alcohol
50.9 ml water
1.5 g organophilic bentonite (Geltone II of NL Baroid Co.)
1.9 g diethanolamine
7.8 g organophilic lignite (Duratone of NL Baroid Co.)
7.8 W/O-emulsifier (EZ-mul NT of NL Baroid Co.)
326.2 g barite
17.5 g KCl.

First of all, the plastic viscosity (PV), the yield point (YP) and the gel strength of each of the invert drilling fluids tested are measured after 10 seconds and after 10 minutes by a viscosity measurement at 50° C. on the unaged material.

The invert drilling fluid is then aged for 16 hours at 125° C. in the autoclave in the so-called "roller-oven", to test the effect of temperature on the stability of the emulsion. The viscosity values are then measured again at 50° C.

The oil phases—i.e. the alcohols or alcohol mixtures—used in these examples are as follows:

Example 1: Synthetic oxoalcohol with a chain length of 10 carbon atoms (commercial product "Etoxo C 10")

Example 2: 100 ml of the synthetic alcohol from Example 1 in admixture with 100 ml of a $C_{8\text{-}10}$-alcohol mixture of natural origin (Applicant's commercial product "Lorol 810")

Example 3: 100 ml of the alcohol as in Example 1 in admixture with 100 ml of a $C_{12\text{-}18}$-alcohol mixture of natural origin (Applicant's commercial product "Lorol technisch")

Example 4: Synthetic alcohol mixture $C_{12/13}$ (commercial product "Lial 123").

The following values were determined for the unaged and aged material:

| Example 1 | | |
|---|---|---|
| | unaged material | aged material |
| plastic viscosity (PV) | 45 | 55 |
| yield point (YP) | 29 | 39 |
| gel strengths (lb/100 ft$^2$) | | |
| 10 sec. | 15 | 15 |
| 10 min. | 14 | 15 |

| Example 2 | | |
|---|---|---|
| | unaged material | aged material |
| plastic viscosity (PV) | 36 | 47 |
| yield point (YP) | 33 | 21 |
| gel strengths (lb/100 ft$^2$) | | |
| 10 sec. | 10 | 5 |
| 10 min. | 13 | 6 |

| Example 3 | | |
|---|---|---|
| | unaged material | aged material |
| plastic viscosity (PV) | 80 | 62 |
| yield point (YP) | 51 | 27 |
| gel strengths (lb/100 ft$^2$) | | |
| 10 sec. | 28 | 6 |
| 10 min. | 29 | 9 |

| Example 4 | | |
|---|---|---|
| | unaged material | aged material |
| plastic viscosity (PV) | 85 | 108 |
| yield point (YP) | 45 | 53 |
| gel strengths (lb/100 ft$^2$) | | |
| 10 sec. | 35 | 40 |
| 10 min. | 38 | 40 |

EXAMPLES 5 TO 8

Comparative tests were carried out with an oil-drilling fluid with the following composition.
200 ml oil phase
50.9 ml water
1.9 g lime
7.8 g organophilic lignite (Duratone of NL Baroid Co.)
326.2 g barite
17.9 g $CaCl_2 \times 2\ H_2O$.

There is no W/O-emulsifier in this drilling fluid formulation. The following alcohols or alcohol/ester oil mixtures are used in Examples 5 to 8 respectively.

Example 5: $C_{8/10}$-alcohol cut of natural origin (Applicant's commercial product "Lorol 810")

Example 6: A mixture of 102 ml of the alcohol in Example 5 and 98 ml of isobutyl oleate Example 7: Synthetic oxo-alcohol $C_{13}$ (isotridecyl alcohol)

Example 8: oxo-oil.

The viscosity values determined for the unaged and aged material are as follows:

| Example 5 | | |
|---|---|---|
| | unaged material | aged material |
| plastic viscosity (PV) | 53 | 40 |
| yield point (YP) | 23 | 10 |
| gel strengths (lb/100 ft$^2$) | | |
| 10 sec. | 9 | 3 |
| 10 min. | 15 | 3 |

| Example 6 | | |
|---|---|---|
| | unaged material | aged material |
| plastic viscosity (PV) | 36 | 28 |
| yield point (YP) | 17 | 21 |
| gel strengths (lb/100 ft$^2$) | | |
| 10 sec. | 7 | 11 |
| 10 min. | 10 | 13 |

| Example 7 | | |
|---|---|---|
| | unaged material | aged material |
| plastic viscosity (PV) | 85 | 108 |
| yield point (YP) | 45 | 53 |
| gel strengths (lb/100 ft$^2$) | | |
| 10 sec. | 35 | 40 |
| 10 min. | 38 | 40 |

| Example 8 | | |
|---|---|---|
| | unaged material | aged material |
| plastic viscosity (PV) | 45 | 55 |
| yield point (YP) | 29 | 39 |
| gel strengths (lb/100 ft$^2$) | | |
| 10 sec. | 14 | 15 |
| 10 min. | 15 | 15 |

EXAMPLES 9 TO 12

These are carried out with a formulation of the following basic composition.
200 ml oil phase
50.9 ml water
1.2 g organophilic bentonite ("Geltone II" of NL Baroid Co.)
1.9 g lime
7.8 g organophilic lignite ("Duratone" of NL Baroid Co.)
7.8 g W/O-emulsifier ("EZ-mul NT" of NL Baroid Co.)
326.2 g barite
17.9 g CaCl$_2$×2 H$_2$O.

In these Examples 9 to 12, mixtures of an ester oil based on rapeseed oil and the already mentioned C$_{8/10}$-alcohol mixture ("Lorol 810") are used as the oil phase with increasing proportions in the mixture of the C$_{8/10}$-alcohol cut.

An undistilled isobutyl rapeseed-oil-ester is used as the ester oil, which is based on a mixture of mainly unsaturated straight-chain carboxylic acids, which correspond approximately to the following distribution: 60% oleic acid, 2% linoleic acid, 9 to 10% linolenic acid, olefin unsaturated C$_{20/22}$-monocarboxylic acids about 4%, the remaining percentage being saturated monocarboxylic acids mainly with from 16–18 carbon atoms. This rapeseed-oil-ester has the following characteristics:

Density (20° C.) 0.872 g/cm$^3$; pour point below—15° C.; flash point (DIN 51584) above 180° C.; acid number (DGF-C-V 2) 1.2; viscosity at 0° C. 32 mPa.s; viscosity at 5° C. 24 mPa.s; no aromatics content.

The mixture ratios of rapeseed-oil ester/Lorol 810 are chosen as follows and displaced in the direction of increasing Lorol 810 content:

Example 9: 170 ml ester oil/30 ml alcohol cut
Example 10: 150 ml ester oil/50 ml alcohol cut
Example 11: 120 ml ester oil/80 ml alcohol cut
Example 12: 100 ml ester oil/100 ml alcohol cut.

The viscosity values determined for the unaged and aged drilling fluids are follows:

| Example 9 | | |
|---|---|---|
| | unaged material | aged material |
| plastic viscosity (PV) | 60 | 43 |
| yield point (YP) | 62 | 39 |
| gel strengths (lb/100 ft$^2$) | | |
| 10 sec. | 33 | 19 |
| 10 min. | 34 | 21 |

| Example 10 | | |
|---|---|---|
| | unaged material | aged material |
| plastic viscosity (PV) | 45 | 39 |
| yield point (YP) | 51 | 39 |
| gel strengths (lb/100 ft$^2$) | | |
| 10 sec. | 25 | 17 |
| 10 min. | 28 | 19 |

| Example 11 | | |
|---|---|---|
| | unaged material | aged material |
| plastic viscosity (PV) | 45 | 33 |
| yield point (YP) | 40 | 24 |
| gel strengths (lb/100 ft$^2$) | | |
| 10 sec. | 19 | 13 |
| 10 min. | 22 | 14 |

| Example 12 | | |
|---|---|---|
| | unaged material | aged material |
| plastic viscosity (PV) | 36 | 28 |
| yield point (YP) | 17 | 21 |
| gel strengths (lb/100 ft$^2$) | | |
| 10 sec. | 7 | 11 |
| 10 min. | 10 | 13 |

COMPARATIVE EXAMPLE AND EXAMPLES 13 TO 16

In the following Comparative Example and the Examples 13 to 16, drilling fluids of the following formulation are used:
200 ml ester oil
50.9 water
1.2 g organophilic bentonite ("Geltone II" of NL Baroid Co.)
1.9 g diethanolamine
7.8 g organophilic lignite ("Duratone" of NL Baroid Co.)

7.8 g W/O-emulsifier ("EZ-mul NT" of NL Baroid Co.)
326.2 g barite
12.5 g KCl.

The Comparative Example uses this formulation with the undistilled isobutyl repeseed oil ester from Examples 9 to 12 as the ester oil. In the subsequent Examples 13 to 16, in each case a selected strongly oleophilic, water-insoluble alcohol as in the teaching of the invention is added to the drilling fluid formulation. The following are the details of these Examples:

Example 13: Addition of 2 g of docosanol, i.e. a linear $C_{22}$-alkanol

Example 14: Addition of 5 g of an EO/PO addition product of a $C_{12-18}$-alcohol cut of natural origin (Applicant's commercial product "Lorol technisch") with the following composition: $C_{12-18}$-alcohol cut/3 EO/6 PO (Applicant's commercial product "Dehyton LT 36")

Example 15: Addition of 5 g of an EO/PO-polyalkyleneglycol with an average molecular weight of about 2000 (commercial product "Dehydran 240")

Example 16: Addition of 2 g of 2,2-dimethyl-1,3-propane-diol (neopentylglycol).

For each of the drilling oil fluids of Examples 13 to 16 and in the Comparative Example, the viscosity values and also the fluid-loss value were determined according to the HTHP method. For the determination of the HTHP fluid-loss value, see the hand book mentioned of NL Baroid Co., London "Manual of drilling fluids technology", subsection "Oil mud technology", chapter PROPERTIES AND TESTING PROCEDURES "HTHP-filtrate".

The comparison of the values measured shows that by adding small amounts of selected alcohols in some cases a distinct improvement in the rheology is obtained (Example 16), and in all cases a marked reduction in the HTHP filtrate, i.e. a definite improvement in the fluid-loss value, is obtained.

The following values apply in detail:

| Comparative Example | unaged material | aged material |
|---|---|---|
| plastic viscosity (PV) | 61 | 47 |
| yield point (YP) | 37 | 41 |
| gel strengths (lb/100 ft$^2$) | | |
| 10 sec. | 24 | 17 |
| 10 min. | 26 | 19 |
| HTHP: 20 ml | | |

| Example 13 | unaged material | aged material |
|---|---|---|
| plastic viscosity (PV) | 54 | 39 |
| yield point (YP) | 48 | 31 |
| gel strengths (lb/100 ft$^2$) | | |
| 10 sec. | 27 | 14 |
| 10 min. | 29 | 15 |
| HTHP: 6 ml | | |

| Example 14 | unaged material | aged material |
|---|---|---|
| plastic viscosity (PV) | 45 | 42 |
| yield point (YP) | 36 | 36 |
| gel strengths (lb/100 ft$^2$) | | |
| 10 sec. | 20 | 18 |
| 10 min. | 23 | 19 |
| HTHP: 7 ml | | |

| Example 15 | unaged material | aged material |
|---|---|---|
| plastic viscosity (PV) | 70 | 36 |
| yield point (YP) | 52 | 27 |
| gel strengths (lb/100 ft$^2$) | | |
| 10 sec. | 35 | 13 |
| 10 min. | 34 | 14 |
| HTHP: 9 ml | | |

| Example 16 | unaged material | aged material |
|---|---|---|
| plastic viscosity (PV) | 44 | 40 |
| yield point (YP) | 24 | 8 |
| gel strengths (lb/100 ft$^2$) | | |
| 10 sec. | 11 | 4 |
| 10 min. | 14 | 5 |
| HTHP: 11 ml | | |

We claim:

1. An invert emulsion drilling mud composition suitable for environmentally-compatible development of petroleum and natural gas deposits, consisting essentially of
   (a) a continuous oil phase consisting essentially of at least about 50 percent by weight, based on the weight of said oil phase, of a substantially water-insoluble mono- or polyfunctional alcohol having at least 6 carbon atoms, with the remainder being up to 50% by weight of a water-insoluble ester oil, said oil phase being free of aromatic molecular constituents, basic amino and carboxyl groups, said oil phase being fluid and pumpable at a temperature of about 0° to about 5° C. and having a flash point above 80° C.,
   (b) an aqueous phase dispersed in said oil phase,
   (c) a water-in-oil emulsifier,
   (d) a weighting agent,
   (e) a viscosifier,
   (f) a fluid loss additive,
   (g) an alkali reserve, and
   (h) an optional component selected from the group consisting of a partial ether of a polyfunctional alcohol, an oleophilic diol having a hydroxyl group in the alpha and omega position or on adjacent carbon atoms or a partial ether thereof, a substantially water-insoluble polyalkyleneglycol ether, and mixtures thereof.

2. An invert emulsion drilling mud composition as in claim 1 wherein said oil phase has a Brookfield (RVT) viscosity of less than about 55 mPas at a temperature of about 0° to about 5° C.

3. An invert emulsion drilling mud composition as in claim 1 wherein said aqueous phase is present in an amount of from about 5 to about 45 percent by weight, based on the weight of said oil phase.

4. An invert emulsion drilling mud composition as in claim 1 having a plastic viscosity of from about 10 to about 60 mPas, and a yield point of from about 5 to about 40 lbs./100 ft.$^2$, each measured at about 50° C.

5. An invert emulsion drilling mud composition as in claim 1 wherein said oil phase has a pour and setting point of below about −5° C.

6. An invert emulsion drilling mud composition as in claim 1 wherein said alcohol is prepared from a monofunctional alcohol having from 6 to 36 carbon atoms.

7. An invert emulsion drilling mud composition as in claim 1 wherein said oil phase further contains a water-insoluble ester oil selected from the group consisting of
   (a) an ester of a $C_1$–$C_5$ monocarboxylic acid and a mono- or polyfunctional alcohol,
   (b) an ester of a $C_6$–$C_{11}$ monocarboxylic acid and a mono-or polyfunctional alcohol,
   (c) a monocarboxylic acid ester of a $C_6$–$C_{12}$ monofunctional alkanol wherein the monocarboxylic acid contains from 12 to 16 carbon atoms and is aliphatically saturated, and
   (d) a monocarboxylic acid ester of a $C_6$–$C_{12}$ monofunctional alcohol wherein the monocarboxylic acid contains from 16 to 24 carbon atoms and is olefinically mono- or poly-unsaturated.

8. An invert emulsion drilling mud composition as in claim 7 wherein the alkali reserve comprises an oleophilic basic amine.

9. An invert emulsion drilling mud composition as in claim 7 wherein the alkali reserve comprises lime present in an amount of less than about 2 lbs./bbl of said drilling mud composition.

10. The process of developing sources of oil and gas by drilling using a drilling mud, comprising circulating the invert emulsion drilling mud composition of claim 1 as the drilling mud.

11. The process of developing sources of oil and gas by drilling using a drilling mud, comprising circulating the invert emulsion drilling mud composition of claim 3 as the drilling mud.

12. The process of developing sources of oil and gas by drilling using a drilling mud, comprising circulating the invert emulsion drilling mud composition of claim 7 as the drilling mud.

13. The process of improving the rheology, emulsification, lubrication and fluid-loss properties of an invert emulsion drilling mud composition comprising a continuous oil phase containing a water-insoluble oil which is fluid and pumpable at a temperature of about 0° to about 5° C. and is selected from (a) an ester of a $C_1$–$C_5$ monocarboxylic acid and a mono-or polyfunctional alcohol, (b) an ester of a $C_6$–$C_{11}$ monocarboxylic acid and a mono- or polyfunctional alcohol, (c) a monocarboxylic acid ester of a $C_6$–$C_{12}$ monofunctional alkanol wherein the monocarboxylic acid contains from 12 to 16 carbon atoms and is aliphatically saturated, and (d) a monocarboxylic acid ester of a $C_6$–$C_{12}$ monofunctional alcohol wherein the monocarboxylic acid contains from 16 to 24 carbon atoms and is olefinically mono- or poly-unsaturated, comprising adding to said drilling mud composition from about 0.1 to about 10% by weight of a substantially-water insoluble mono- or polyfunctional alcohol having at least 6 carbon atoms, said alcohol being fluid and pumpable at a temperature of about 0° to about 5° C. and having a flash point above 80° C., said oil phase being free of aromatic molecular constituents, basic amino and carboxyl groups.

* * * * *

Disclaimer 5,348,938—Heinz Mueller, Monheim; Claus-Peter Herold, Mettmann; Stephan von Tapavicza, Erkrath, all of Fed. Rep. of Germany. OLEOPHILIC ALCOHOLS AS A CONSTITUENT OF INVERT DRILLING FLUIDS. Patent dated September 20, 1994. Disclaimer filed July 17, 1997, by the assignee, Baroid Limited.

The term of this patent shall not extend beyond the expiration date of Patent No. 5,194,422.
*(Official Gazette,* November 4, 1997)

UNITED STATES PATENT AND TRADEMARK OFFICE
Certificate

Patent No. 5,348,938

Patented: September 20, 1994

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Heinz Mueller, Monheim, Fed. Rep. of Germany; Claus-Peter Herold, Mettmann, Fed. Rep. of Germany; Stephan von Tapavicza, Fed. Rep. of Germany; and Douglas J. Grimes, Stonehaven, Scotland.

Signed and Sealed this Twenty-fifth Day of February 2003.

JAMES O. WILSON
*Supervisory Patent Examiner*
Art Unit 1623